(12) United States Patent
Yu et al.

(10) Patent No.: US 11,776,267 B2
(45) Date of Patent: Oct. 3, 2023

(54) INTELLIGENT CATALOGING METHOD FOR ALL-MEDIA NEWS BASED ON MULTI-MODAL INFORMATION FUSION UNDERSTANDING

(71) Applicant: COMMUNICATION UNIVERSITY OF ZHEJIANG, Hangzhou (CN)

(72) Inventors: Dingguo Yu, Hangzhou (CN); Suiyu Zhang, Hangzhou (CN); Liping Fang, Hangzhou (CN); Yongjiang Qian, Hangzhou (CN); Yaqi Wang, Hangzhou (CN); Xiaoyu Ma, Hangzhou (CN)

(73) Assignee: COMMUNICATION UNIVERSITY OF ZHEJIANG, Hangzhou (CN)

( * ) Notice: Subject to any disclaimer, the term of this patent is extended or adjusted under 35 U.S.C. 154(b) by 91 days.

(21) Appl. No.: 17/674,321

(22) Filed: Feb. 17, 2022

(65) Prior Publication Data
US 2022/0270369 A1   Aug. 25, 2022

(30) Foreign Application Priority Data
Feb. 22, 2021   (CN) .......................... 202110198428.1

(51) Int. Cl.
| | |
|---|---|
| *H04N 7/00* | (2011.01) |
| *G06V 20/40* | (2022.01) |
| *G06V 10/80* | (2022.01) |
| *G06N 3/044* | (2023.01) |
| *G06N 3/045* | (2023.01) |

(52) U.S. Cl.
CPC ............. *G06V 20/43* (2022.01); *G06N 3/044* (2023.01); *G06N 3/045* (2023.01); *G06V 10/803* (2022.01); *G06V 20/46* (2022.01); *G06V 20/49* (2022.01)

(58) Field of Classification Search
CPC ......... G06V 20/46; G06V 20/43; G06V 20/49
USPC ......................................................... 348/468
See application file for complete search history.

(56) References Cited

U.S. PATENT DOCUMENTS

| | | | |
|---|---|---|---|
| 9,436,876 B1 * | 9/2016 | Carlson ............... | G06F 18/2323 |
| 10,860,860 B1 * | 12/2020 | Huynh .................. | G06F 16/739 |
| 11,342,003 B1 * | 5/2022 | Siagian .................. | G11B 27/28 |
| 11,698,922 B2 * | 7/2023 | Pedersen ................ | G06F 16/35 |
| | | | 706/12 |

(Continued)

*Primary Examiner* — Hee Soo Kim
(74) *Attorney, Agent, or Firm* — Brian S. Boyer; SYNDICATED LAW, PC.

(57) ABSTRACT

The present disclosure provides an intelligent cataloging method for all-media news based on multi-modal information fusion understanding, which obtains multi-modal fusion features by unified representation and fusion understanding of video information, voice information, subtitle bar information, and character information in the all-media news, and realizes automatic slicing, automatic cataloging description, and automatic scene classification of news using the multi-modal fusion features. The beneficial effect of the present disclosure is that it realizes the complete process of automatic comprehensive cataloging for the all-media news, and improves the accuracy and generalization of the cataloging method, and greatly reduces the manual cataloging time by generating stripping marks, news cataloging descriptions, news classification labels, news keywords, and news characters based on the fusion of multi-modes of video, audio, and text.

6 Claims, 4 Drawing Sheets

(56) References Cited

U.S. PATENT DOCUMENTS

2002/0194199 A1\* 12/2002 Flank .................. G06F 16/5838
707/E17.022
2013/0259375 A1\* 10/2013 Dunlop .................. G06V 20/38
382/173
2020/0336802 A1\* 10/2020 Russell .................. G06V 20/46

\* cited by examiner

INTELLIGENT CATALOGING METHOD FOR ALL-MEDIA NEWS BASED ON MULTI-MODAL INFORMATION FUSION UNDERSTANDING

CROSS REFERENCE TO RELATED APPLICATION

This patent application claims the benefit and priority of Chinese Patent Application No. 202110198428.1., filed on Feb. 22, 2021, the disclosure of which is incorporated by reference herein in its entirety as part of the present application.

TECHNICAL FIELD

The present disclosure relates to the field of intelligent media, and in particular to an intelligent cataloging method for all-media news based on multi-modal information fusion understanding.

BACKGROUND ART

With the popularization of smart mobile devices and the development of digital media content, all-media news content including images, video, voice, and text is produced at high frequency and spread quickly. Due to the problems of massive resources and high labor costs, it is more and more urgent for the media industry to seek intelligent methods in the resource management process such as classification, cataloging, and retrieval.

All-media news is a typical multi-modal content carrier, and contains multi-modal information such as live news or studio images, news subtitle text, and news broadcast voice, which makes it impossible for intelligent technology for single-modal processing to effectively replace the manual process in cataloging tasks. Compared with a single mode, complementarity and relevance between multi-modes provide supervision information for solving potential explanatory factors of each mode. The comprehensive processing of multi-modal information such as representation, transformation, and fusion is closer to human intelligence's perception and understanding of the natural world. Therefore, how to fuse multi-modal information in news content and realize the automated cataloging process of resources is a widespread demand and challenge in the media industry.

At present, whether it is a traditional radio and television unit represented by a TV station or an emerging self-media community represented by Toutiao, manual cataloging is still a common method for media content classification and storage. The general procedure is: catalogers first slice (strip) news video according to scenes or shots, and then text descriptions, keyword descriptions, radio and television classification descriptions, and key figure descriptions are performed on the content of each fragment, and finally submitted to the database. High-quality news cataloging can provide high-quality resource retrieval, resource-on-demand, and resource recommendation, and is an important basic business process in the all-media era. Although new frameworks or new technologies such as cloud media asset systems and deep learning have increased the automation of news cataloging process in recent years, they are often limited to cloud management of resources or single-task processing of single-modal content, which cannot cover the complete process required for cataloging to achieve a comprehensive intelligent pipeline. The existing cataloging methods are summarized as follows:

1. Traditional cataloging management system: the slicing, description and classification of news resources are performed manually. All operations depend on the subjective judgment of the cataloger. This method is commonly used in traditional media asset management systems in the media industry. A manager first logs in to the system, then performs corresponding operations on the resources to be compiled, and finally submits to the system to complete the storage.

2. Cataloging system with intelligent stripping assistance: a segmentation method based on shot conversion is used to split news resources into independent fragments (that is, automatically labeling start and end times of stripping), and the cataloger confirms the slicing effect, and then manually completes the follow-up work such as fragment description and classification.

3. Cataloging system with intelligent scene classification: video scenes are intelligently classified using deep learning, video is automatically labeled with scenes such as "variety show", "sports", and "animation", and the cataloger confirms the classification labels, and then manually completes the follow-up work such as stripping, fragment description, and classification.

4. Comprehensive intelligent cataloging system: a comprehensive system contains several functions in the above items 1, 2, and 3, but each function in the system is relatively independent, that is, the corresponding algorithm is run for the same resource to generate results based on single-modal information.

The above cataloging method has two main drawbacks. First, the intelligent algorithms involved in the system are all methods for the extraction, analysis, and generation of single-modal content. Even though artificial intelligence technologies such as computer vision, natural language processing, and voice recognition have reached the ability of approaching or surpassing the human brain in the task of processing the single-modal information, but the single-modal information often fails to provide complete knowledge of the scene or phenomenon. In the all-media news cataloging process, due to the lack of effective methods for unified representation (fusion) and comprehensive analysis (understanding) of the multi-modal information contained in the news content, a large amount of classification, labeling, description, and audit work still need to be completed at a relatively high labor cost. Second, methods such as video shot segmentation and video semantic description in the intelligent cataloging system are transplanted from existing machine learning task scenes. These methods have compatibility problems when facing news report scenes: for the segmentation based on shot conversion, only front and rear frame changes are considered, and it is often used as the pre-step of key frame extraction, but the continuity of events in the same scene is not considered. For example, the switch between the long shot and the middle shot in the same event is generally regarded as a fragment in news cataloging, and does not to be segmented. Video semantic description often analyzes the description of actions and events in the scene, but it does not focus on the behavior and events of core characters, which does not meet the requirements of fragment content description in the catalog.

SUMMARY

In view of the effect bottleneck and manual dependency caused by a single-modal processing mode of news content in an existing cataloging process, and the compatibility of cataloging algorithms for news report content, the present disclosure provides an intelligent cataloging method for all-media news based on multi-modal information fusion understanding, which improves the integrity, effectiveness, and compatibility of knowledge required for cataloging from news reports, so as to realize an intelligent cataloging process with higher accuracy and automation.

An intelligent cataloging method for all-media news based on multi-modal information fusion understanding includes the following steps:

1) obtaining original news video, segmenting shot fragments, and locating scene key frames;

2) inferring scene classification labels from the scene key frames obtained in step 1) and merging adjacent shot fragments with similar scene labels to generate multiple slice fragments;

3) performing visual feature extraction on the slice fragments obtained in step 2) and generating news description text;

4) performing voice recognition on the slice fragments obtained in step 2) to obtain voice text;

5) extracting image frame recognition of the slice fragments obtained in step 2) to obtain subtitle bar text;

6) recognizing facial features in the slice fragments obtained in step 2) and matching the facial features in a news character database to obtain character information text; and 7) inputting the news description text obtained in step 3), the voice text obtained in step 4), the subtitle bar text obtained in step 5), and the character information text obtained in step 6) into a generative model of multi-modal fusion for processing to generate news keywords and comprehensive cataloging descriptions, and performing outputting after sorting and assembly to complete intelligent cataloging for the news.

In step 1), a process of obtaining original news video, segmenting shot fragments and locating scene key frames may specifically include:

processing the original news video into a set of static image frames, calculating a histogram difference between each frame and the previous frame, setting a window range and a window moving step, taking a frame with the maximum difference in a window as a shot boundary frame, taking all frames between two shot boundary frames as the shot fragment (recording an i-th shot fragment as $D_i$, i being a fragment number starting from 1), and extracting a middle frame of each shot fragment as the scene key frame of the fragment (recording the scene key frame in the fragment $D_i$ as $k_i$).

In step 2), a process of inferring scene classification labels from the scene key frames obtained in step 1) and merging adjacent shot fragments with similar scene labels to generate multiple slice fragments may specifically include:

A) extracting visual features of each scene key frame $k_i$ through a trained residual network for a news scene classification task, and obtaining the scene classification labels for news scenes with the highest matching degree by inferring (the preset news scene classification labels include common scenes in news reports such as "studio", "conference site", and "outdoor connection");

B) based on the scene classification labels of each fragment obtained in step A), merging adjacent same scenes; and C) taking shot boundary marks remaining after processing in step B) as slice marks of the news video, and taking a frame sequence between adjacent shot boundary marks as the slice fragment to generate the multiple slice segments.

In step B), it may specifically include: if an overlap rate of a scene classification label of $k_i$ and a scene classification label of $k_{i-1}$ is greater than a preset threshold (set to 0.5 in the present disclosure), deleting a shot boundary mark between the fragments $D_i$ and $D_{i-1}$, and taking a union of the scene classification labels of the two as a new classification label of the merged fragment.

In step 3), based on the slice fragments in step 2), video descriptions of each fragment may be generated through a trained news video cataloging description model. A specific method may be: extracting the visual features of the fragments through a convolutional neural network module, and then passing these visual features to a long short-term memory (LSTM) network module to generate natural language text describing news content. The text may conform to a description language style (structure) required by a news cataloging task.

In step 4), based on an audio stream of the slice fragments in step 2), audio features may be extracted and converted through voice recognition technology to generate voice text.

In step 5), image frames may be extracted from the slice fragments in step 2) at intervals of the number of frames generated in one second (that is, extracting one frame at an interval of 1 second). Then, the subtitle bar text may be extracted through a trained convolutional neural network for text recognition in the image based on the extracted image frames. Finally, the extracted text may be compared and deduplicated, and the final subtitle recognition text may be output.

In step 6), based on the slice fragments in step 2), the facial features in the fragments may be extracted through a convolutional neural network trained for a facial recognition task. Then, the extracted facial features may be matched with facial features in the news character database. If the similarity reaches a preset threshold (set to 0.72 in the present disclosure), information text of the character may be obtained.

In step 7), the news description text obtained in step 3) may be taken as a main feature, and the voice text obtained in step 4), the subtitle bar text obtained in step 5), and the character information text obtained in step 6) may be taken as auxiliary features to input into the generative model of multi-modal fusion.

A process of inputting into a generative model of multi-modal fusion for processing may specifically include:

inputting the news description text, the voice text, the subtitle bar text, and the character information text into an embedding layer trained through news corpus text to transform the text into semantic feature vectors, then mapping these vectors to a unified semantic space through a unified mapping layer respectively, then passing the vectors in the unified semantic space to a news semantic fusion layer for fusion understanding to obtain news fusion features with redundant information eliminated, and finally using the news fusion features to generate the comprehensive cataloging descriptions and a criticality of the news keywords (that is, a degree of recommendation of the word as the news keyword) through a trained text decoding layer.

The generative model of multi-modal fusion may use the following formulas:

$$\text{text embedding:} V_x = x_1 v_1 i + x_2 v_2 + \ldots + x_n v_n,$$

in the formula, x may be one-hot encoding of embedded text based on an embedded dictionary, and n may be a dimension of the embedded dictionary; if $x_i$ is a non-zero bit of x, $v_i$ may be a vector row of the text corresponding to the embedded dictionary; and $V_x$ may be a vector after the text is embedded;

unified mapping:

$$W(x) = f(Ax^T + b) = f\left(\begin{bmatrix} a_{1,1} & a_{1,2} & \cdots & a_{1,k} \\ a_{2,1} & a_{2,2} & \cdots & a_{2,k} \\ \vdots & \vdots & \vdots & \vdots \\ a_{m,1} & a_{m,2} & \cdots & a_{m,k} \end{bmatrix} \cdot \begin{bmatrix} x_1 \\ x_2 \\ \vdots \\ x_k \end{bmatrix} + \begin{bmatrix} b_1 \\ b_2 \\ \vdots \\ b_m \end{bmatrix}\right),$$

in the formula, A, b, and f(−) may represent a weight matrix, an offset vector, and an activation function of the mapping layer respectively; k may be a dimension of an input vector x, and m may be a vector dimension of a unified domain after mapping; and $a_{i,j}$ may be a weight coefficient of an i-th row and j-th column of the matrix A, and $b_i$ may be a coefficient of a vector in the order of i in the vector b;

semantic fusion:

$$R(x_1, x_2, x_3, \cdots) = f\left(A\begin{bmatrix} w_1 x_1 \\ w_2 x_2 \\ w_3 x_3 \\ \vdots \end{bmatrix} + b\right),$$

in the formula, $x_i$ may be a vector of a mode i in the unified semantic space, and $w_i$ may be a news semantic weight coefficient corresponding to $x_i$; and A, b, and f(−) may represent a weight matrix, an offset vector, and an activation function of a final layer of the fusion layer respectively; and text decoding: the process may be implemented by stacking multiple LSTM networks:

$L_1 = LSTM_1(R)$
$L_{i+1} = LSTM_{i+1}(L_i)$
$C(L_i) = f(L_i; W, b)$
Output$_{text}$ = [$O_{L_1}, O_{L_2}, O_{L_3}, \ldots$]
Output$_{criticality}$ [$C(L_1), C(L_2), C(L_3), \ldots$], in the formula, R may be a feature vector after fusion; $LSTM_i(-)$ may be function representation of an i-th LSTM network having feature output of $L_i$ and text output of $O_{L_i}$; f(−;W,b) may be function representation of criticality operation, W and b may be a weight matrix and an offset vector of a layer undertaking the operation, and the criticality obtained based on the $L_i$ operation may be expressed as $C_{L_i}$; Output$_{text}$ may be a complete text description finally generated, and may be a queue composed of the text output of each LSTM network; and Output$_{criticality}$ may be a queue composed of a key rate corresponding to each word in the text description.

Structures output after sorting and assembly include: "original video id", "fragment sequence id", "start and end time of fragment", "automatic description text", "automatic character recognition", "automatic scene classification", "subtitle recognition text", "voice recognition text", and "automatic news keyword".

Figure 2:
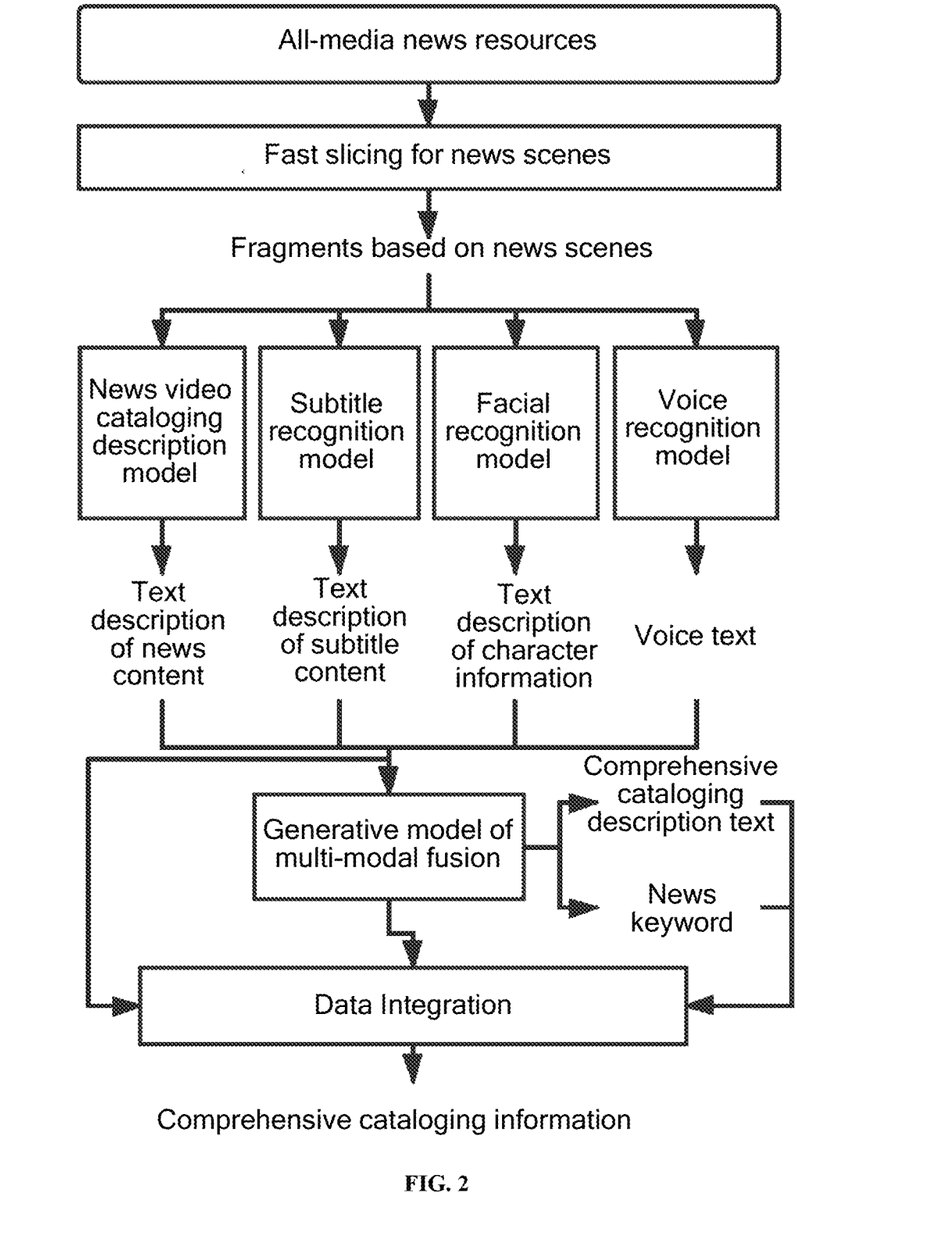
FIG. 2 is a schematic flow diagram of intelligent cataloging for news according to the present disclosure.

Specifically, an automated process of multi-modal information intelligent cataloging for all-media news reports includes the following steps:

step 1: preprocessing original news video, and searching for shot boundary frames and scene key frames within shots, where a process specifically includes: processing the original news video into a set of static image frames, calculating a histogram difference between each frame and the previous frame, setting a window range and a window moving step, taking a frame with the maximum difference in a window as a shot boundary frame, taking all frames between two shot boundary frames as the shot fragment (recording an i-th shot fragment as $D_i$, i being a fragment number starting from 1), and extracting a middle frame of each shot fragment as the scene key frame of the fragment (recording the scene key frame in the fragment $D_i$ as $k_i$);

step 2: extracting visual features of each scene key frame $k_i$ in step 1 through a trained residual network for a news scene classification task, and obtaining the classification labels for news scenes with the highest matching degree by inferring (the preset news scene classification labels include common scenes in news reports such as "studio", "conference site", and "outdoor connection");

step 3: based on the scene classification labels of each fragment obtained in step 2, merging adjacent same scenes, where a process specifically includes: if an overlap rate of a scene classification label of $k_i$ and a scene classification label of $k_{i-1}$ is greater than a preset threshold (set to 0.5 in the present disclosure), deleting a shot boundary mark between the fragments $D_i$ and $D_{i-1}$, and taking a union of the scene classification labels of the two as a new classification label of the merged fragment;

step 4: taking shot boundary marks remaining after processing in step 3 as slice marks of the news video, and taking a frame sequence between adjacent shot boundary marks as the slice fragment to generate the multiple slice segments;

step 5: based on the slice fragments in step 4, generating video descriptions of each fragment through a trained news video cataloging description model, where a process specifically includes: extracting the visual features of the fragments through a convolutional neural network module, and then passing these visual features to an LSTM network module to generate natural language text describing news content, and the text conforms to a description language style (structure) required by a news cataloging task;

step 6: based on an audio stream of the slice fragments in step 4, extracting and converting audio features through voice recognition technology to generate voice text;

step 7: extracting image frames from the slice fragments in step 4 at intervals of the number of frames generated in one second (that is, extracting one frame at an interval of 1 second), then extracting the subtitle bar text through a trained convolutional neural network for text recognition in the image based on the extracted image frames, and finally comparing and deduplicating the extracted text, and outputting the final subtitle recognition text;

step 8: based on the slice fragments in step 4, extracting the facial features in the fragments through a convolutional neural network trained for a facial recognition task, and then matching the extracted facial features with facial features in the news character database, where if the similarity reaches a preset threshold (set to 0.72 in the present disclosure), information text of the character is obtained;

step 9: taking the description text obtained in step 5 as a main feature, and the news scene classification labels obtained in step 2, the voice text obtained in step 6, the subtitle text obtained in step 7, and the character information text obtained in step 8 as auxiliary features, and eliminating redundant information through the generative model of multi-modal fusion for the news content as shown in FIG. 2 to generate several effective and unique news keywords and comprehensive cataloging descriptions, where a process specifically includes: inputting the text features obtained from different modes into an embedding layer trained through news corpus text to transform the text into semantic feature vectors, then mapping these vectors to a unified semantic space through a unified mapping layer respectively, then passing the vectors in the unified semantic space to a news semantic fusion layer for fusion understanding to obtain news fusion features with redundant information eliminated, and finally using the news fusion features to generate comprehensive cataloging description text and a criticality of the news keywords (that is, a degree of recommendation of the word as the news keyword) through a trained text decoding layer; a process in the above model may be expressed by the following formulas:

text embedding: $V_x = x_1 v_1 + x_2 v_2 + \ldots + x_n v_n$, in the formula, x is one-hot encoding of embedded text based on an embedded dictionary, and n is a dimension of the embedded dictionary; if $x_i$ is a non-zero bit of x, $v_i$ is a vector row of the text corresponding to the embedded dictionary; and $V_x$ is a vector after the text is embedded;

unified mapping:

$$W(x) = f(Ax^T + b) = f\left(\begin{bmatrix} a_{1,1} & a_{1,2} & \cdots & a_{1,k} \\ a_{2,1} & a_{2,2} & \cdots & a_{2,k} \\ \vdots & \vdots & \vdots & \vdots \\ a_{m,1} & a_{m,2} & \cdots & a_{m,k} \end{bmatrix} \cdot \begin{bmatrix} x_1 \\ x_2 \\ \vdots \\ x_k \end{bmatrix} + \begin{bmatrix} b_1 \\ b_2 \\ \vdots \\ b_m \end{bmatrix}\right),$$

in the formula, A, b, and f(−) represent a weight matrix, an offset vector, and an activation function of the mapping layer respectively; k is a dimension of an input vector x; m is a vector dimension of a unified domain after mapping; and $a_{i,j}$ is a weight coefficient of an i-th row and j-th column of the matrix A, and $b_i$ is a coefficient of a vector in the order of i in the vector b;

semantic fusion:

$$R(x_1, x_2, x_3, \cdots) = f\left(A \begin{bmatrix} w_1 x_1 \\ w_2 x_2 \\ w_3 x_3 \\ \vdots \end{bmatrix} + b\right),$$

in the formula, $x_i$ is a vector of a mode i in the unified semantic space, and $w_i$ is a news semantic weight coefficient corresponding to $x_i$; and A, b, and f(−) represent a weight matrix, an offset vector, and an activation function of a final layer of the fusion layer respectively; and text decoding: the process is implemented by stacking multiple LSTM networks:

$L_1 = LSTM_1(R)$
$L_{i+1} = LSTM_{i+1}(L_i)$
$C(L_i) = f(L_i; W, b)$
$Output_{text} = [O_{L_1}, O_{L_2}, O_{L_3}, \ldots]$
$Output_{criticality} = [C(L_1), C(L_2), C(L_3), \ldots]$, in the formula, R is a feature vector after fusion; $LSTM_i$ (−) is function representation of an i-th LSTM network having feature output of $L_i$ and text output of $O_{L_i}$; f(−; W,b) is function representation of criticality operation, W and b are a weight matrix and an offset vector of a layer undertaking the operation, and the criticality obtained based on the $L_i$ operation is expressed as $C_{L_i}$; $Output_{text}$ is a complete text description finally generated, and is a queue composed of the text output of each LSTM network; and $Output_{criticality}$ is a queue composed of a key rate corresponding to each word in the text description; and step 10: assembling information related to cataloging knowledge in steps 1 to 9, outputting as data of a structure including {"original video id", "fragment sequence id", "start and end time of fragment", "automatic description text", "automatic character recognition", "automatic scene classification", "subtitle recognition text", "voice recognition text", and "automatic news keyword"}, and storing in a database. Steps 1 to 10 fully realize the automated process of intelligent cataloging for the news video.

Compared with the prior art, the present disclosure has the following advantages:

The present disclosure provides a fast video slicing and classification method for news scenes which realizes video slicing and scene classification tasks. The difference from the existing methods is as follows. (1) The method directly orients toward shot segmentation requirements of the news report video: an existing basic shot segmentation method only relies on searching for shot boundary frames to segment the video into multiple shot fragments without considering the same scene content represented by multiple shots, which does not meet the requirements of news cataloging slicing, while the method provided by the present disclosure merges adjacent shot fragments with similar scene labels to avoid the situation that the granularity of shot segmentation is too fine. (2) Low-complexity news scene determination: the existing video classification methods based on visual features obtain video classification labels through target detection and video stream feature extraction and analysis, which has better effect but high complexity. The method provided by the present disclosure classifies scenes synchronously during shot segmentation, and only one frame of image in the fragment is subjected to visual feature extraction and analysis, which reduces complexity as much as possible on the premise of ensuring reliable news scene classification.

In view of the cataloging requirements for the all-media news content, the present disclosure provides an intelligent cataloging method based on multi-modal information fusion understanding, which can realize the unified representation and fusion understanding of news video, broadcast voice, news subtitle bars, and news characters, and automatically generate comprehensive cataloging information. The method of the present disclosure realizes the complete process of automatic comprehensive cataloging for the all-media news, improves the accuracy and generalization of the cataloging method by generating stripping marks, news cataloging descriptions, news classification labels, news keywords, and news characters based on the fusion of multi-modes of video, audio, and text, and greatly reduces the manual cataloging time.

DETAILED DESCRIPTION OF THE EMBODIMENTS

An intelligent cataloging method for all-media news based on multi-modal information fusion understanding includes: an automated process of multi-modal information intelligent cataloging for all-media news reports, and a process of fusing multi-modal news information to generate news keywords and comprehensive cataloging descriptions. The automated process of multi-modal information intelligent cataloging for all-media news reports includes: a fast video slicing and classification method for news scenes, a process of performing automatic video description for news reports, voice recognition for the news reports, news subtitle bar recognition, and news character matching on the segmented fragments, and a process of fusing multi-modal news information to generate comprehensive cataloging information.

The process of fusing the multi-modal news information to generate the news keywords and the comprehensive cataloging descriptions includes: news fragment image information, news fragment voice information, news fragment subtitle bar information, and news fragment character information are taken as input; multi-modal features in the news content are converted into semantic text and mapped to a unified semantic space for fusion; and the news keywords and comprehensive news cataloging descriptions are generated based on the news features in the unified space.

The fast video slicing and classification method for news scenes includes: shot boundary frames and news scene key frames are quickly located based on the difference between frames; visual features are extracted based on news scene key frame images for fast scene classification label determination; and adjacent shot fragments with a high overlap rate of scene classification labels are merged to obtain video slice (strip) fragments that meet the requirements of news cataloging.

Figure 1:
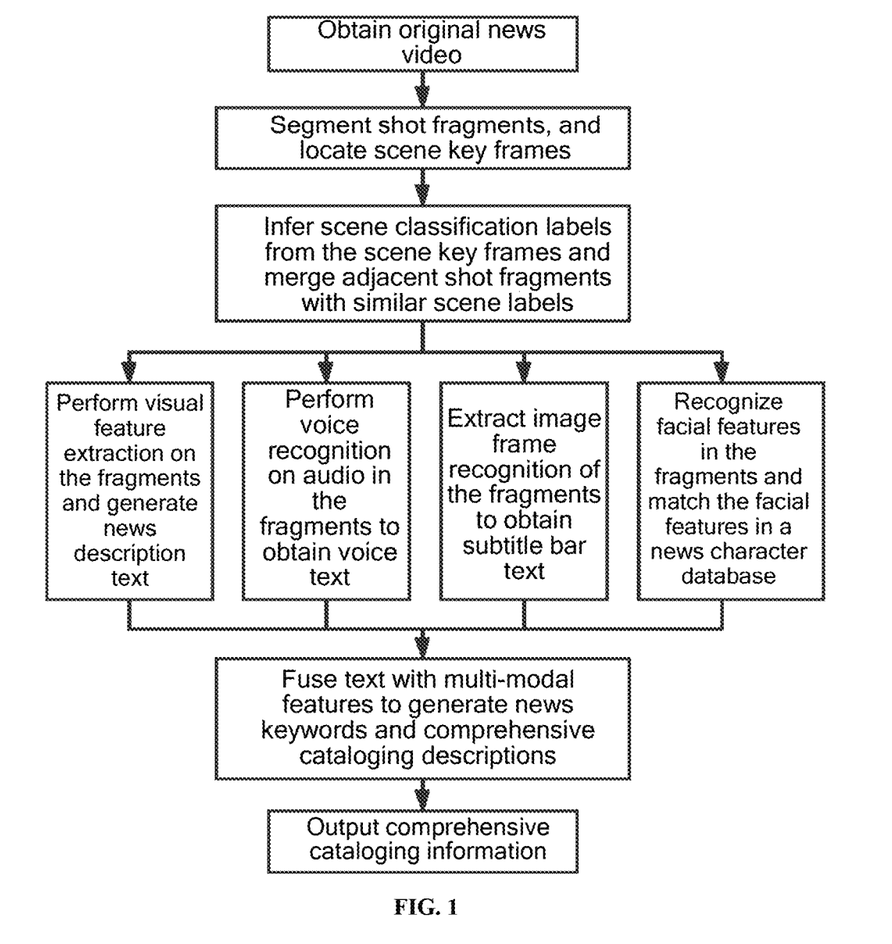
FIG. 1 is a schematic flow diagram of an intelligent cataloging method for all-media news based on multi-modal information fusion understanding according to the present disclosure.

As shown in FIG. 1 and FIG. 2, an intelligent cataloging method for all-media news based on multi-modal information fusion understanding includes the following steps.

Step 1: original news video is processed into a set of static image frames, a histogram difference between each frame and the previous frame is calculated, a window range and a window moving step are set, and a queue N of possible frames of a shot boundary is set, and is initially an empty set. 10 frames is taken as the window range and 8 frames are taken as the step. Starting from an initial frame of the video, the following process is repeated: the frame with the maximum difference is searched in the current window, and a step distance between this frame and the frame last added to the queue N is determined. If the distance is greater than a preset minimum shot length, the frame is added to the queue N. All frames between two shot boundary frames are taken as the shot fragment (an i-th shot fragment is recorded as $D_i$, and i is a fragment number starting from 1), and a middle frame of each shot fragment is extracted as the scene key frame of the fragment (the scene key frame in the fragment $D_i$ is recorded as $k_i$).

Step 2: a news scene classification image data set is built, common scene labels in news reports such as "studio", "conference site", and "outdoor connection" are set for the images, and the residual network for the classification task of news scenes is trained. Visual features of each scene key frame $k_i$ in step 1 are extracted through a trained residual network, and the classification labels for news scenes with the highest matching degree are obtained by inferring.

Step 3: based on the scene classification labels of each fragment obtained in step 2, adjacent same scenes are merged. A process specifically includes: if an overlap rate of a scene classification label of $k_i$ and a scene classification label of $k_{i-1}$ is greater than a preset threshold (set to 0.5 in the present disclosure), a shot boundary mark between the fragments $D_i$ and $D_{i-1}$ is deleted, and a union of the scene classification labels of the two is taken as a new classification label of the merged fragment.

Step 4: shot boundary marks remaining after processing in step 3 are taken as slice marks of the news video, and a frame sequence between adjacent shot boundary marks is taken as the slice fragment.

Step 5: based on the slice fragments in step 4, video descriptions of each fragment are generated through a trained news video cataloging description model. A process of training the news video cataloging description model specifically includes: the news video is manually sliced into fragments of a single scene, the fragments are subjected to manual cataloging description, the fragments are taken as input features, the description text corresponding to the fragments is taken as target output, and the model is iteratively trained by taking reduction of differences between actual output and the target output of the model as a task goal. A process of inferring of the news video cataloging description model specifically includes: the fragments are input into the model, the visual features of the fragments are extracted through a convolutional neural network module in the model, and then these visual features are passed to an LSTM network module of the model to generate natural language text describing the news content.

Step 6: based on an audio stream of the slice fragments in step 4, audio features are extracted and converted through voice recognition technology to generate voice text.

Step 7: image frames are extracted from the slice fragments in step 4 at intervals of the number of frames generated in one second (that is, extracting one frame at an interval of 1 second). Then, the subtitle bar text is extracted through a trained convolutional neural network for a text recognition task in the image based on the extracted image frames. Finally, the extracted text is compared and deduplicated, and the final subtitle recognition text is output.

Step 8: image frames are extracted from the slice fragments in step 4 at intervals of the number of frames generated in one second (that is, extracting one frame at an interval of 1 second). Then, the facial features are extracted through a trained convolutional neural network for a facial recognition task in the image based on the extracted image frames. Then, the extracted facial features are matched with facial features in the news character database. If the similarity reaches a preset threshold (set to 0.72 in the present disclosure), then the character is set as a successfully matched character, and finally information text of several matched successfully characters that are not repeated is output.

Figure 3:
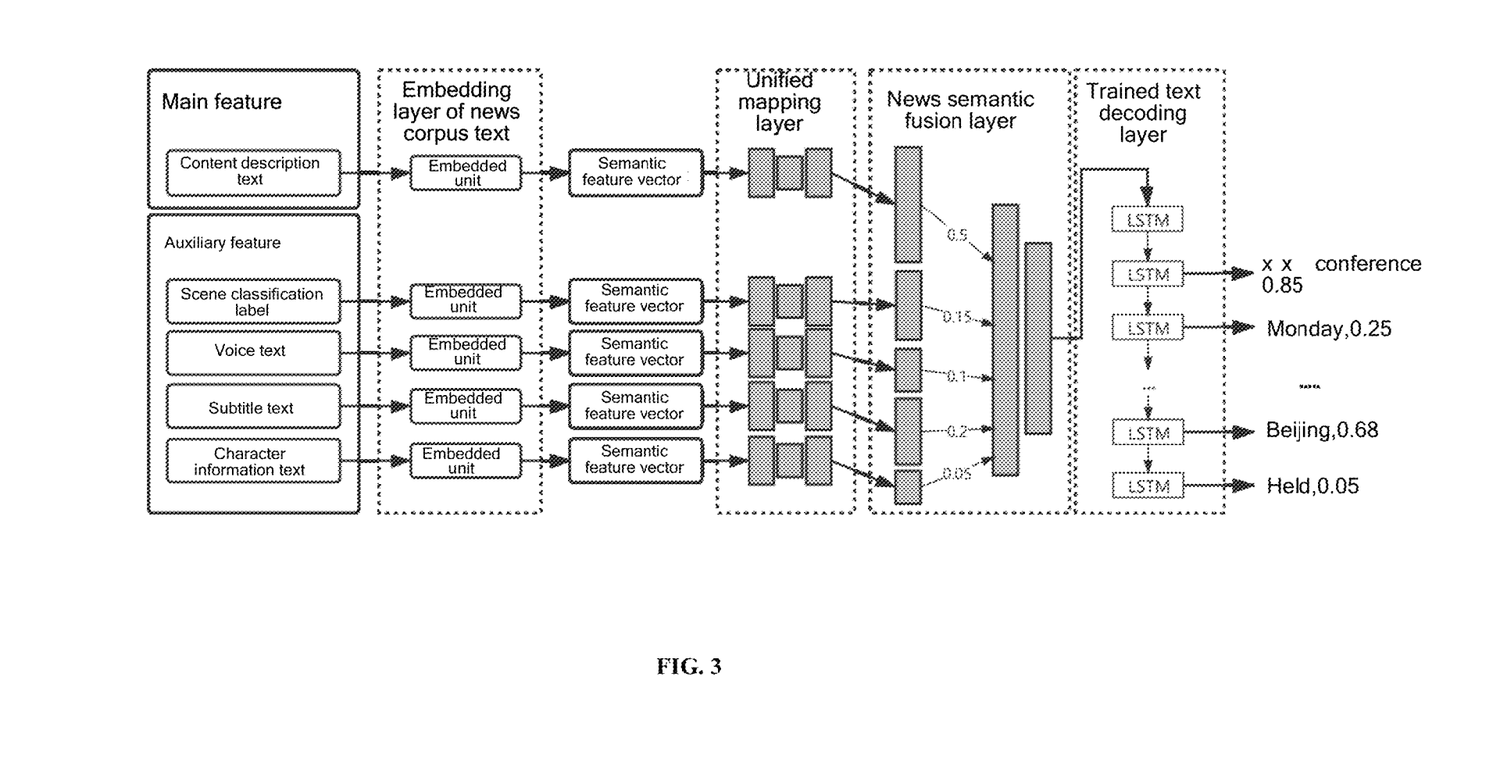
FIG. 3 is a schematic diagram of a generative model of multi-modal fusion of news content according to the present disclosure.

Step 9: the description text obtained in step 5 is taken as a main feature, and the news scene classification labels obtained in step 2, the voice text obtained in step 6, the subtitle text obtained in step 7, and the character information text obtained in step 8 are taken as auxiliary features. Redundant information is eliminated through the generative model of multi-modal fusion for the news content as shown in FIG. 3 to generate several effective and unique news keywords and comprehensive cataloging descriptions. A process specifically includes: the text features obtained from different modes are input into an embedding layer trained through news corpus text to transform the text into semantic feature vectors. Then, these vectors are mapped to a unified semantic space through a unified mapping layer respectively. Then, the vectors in the unified semantic space are passed to a news semantic fusion layer for fusion understanding to obtain news fusion features with redundant information eliminated. Finally, the news fusion features are used to generate comprehensive cataloging description text and a criticality of the words herein (that is, a degree of recommendation of the word as the news keyword) through a trained text decoding layer. A process in the above model may be expressed by the following formulas:

text embedding: $V_x = x_1 v_1 + x_2 v_2 + \ldots + x_n v_n$,

In the formula, x is one-hot encoding of embedded text based on an embedded dictionary, and n is a dimension of the embedded dictionary; if $x_i$ is a non-zero bit of x, $v_i$ is a vector row of the text corresponding to the embedded dictionary; and $V_x$ is a vector after the text is embedded.

unified mapping:

$$W(x) = f(Ax^T + b) = f\left(\begin{bmatrix} a_{1,1} & a_{1,2} & \cdots & a_{1,k} \\ a_{2,1} & a_{2,2} & \cdots & a_{2,k} \\ \vdots & \vdots & \vdots & \vdots \\ a_{m,1} & a_{m,2} & \cdots & a_{m,k} \end{bmatrix} \cdot \begin{bmatrix} x_1 \\ x_2 \\ \vdots \\ x_k \end{bmatrix} + \begin{bmatrix} b_1 \\ b_2 \\ \vdots \\ b_m \end{bmatrix}\right)$$

In the formula, A, b, and f(−) represent a weight matrix, an offset vector, and an activation function of the mapping layer respectively; k is a dimension of an input vector x; m is a vector dimension of a unified domain after mapping; and $a_{i,j}$ is a weight coefficient of an i-th row and j-th column of the matrix A, and $b_i$ is a coefficient of a vector in the order of i in the vector b.

semantic fusion:

$$R(x_1, x_2, x_3, \cdots) = f\left(A \begin{bmatrix} w_1 x_1 \\ w_2 x_2 \\ w_3 x_3 \\ \vdots \end{bmatrix} + b\right)$$

In the formula, $x_i$ is a vector of a mode i in the unified semantic space, and $w_i$ is a news semantic weight coefficient corresponding to $x_i$; and A, b, and f(−) represent a weight matrix, an offset vector, and an activation function of a final layer of the fusion layer respectively.

Text decoding: the process is implemented by stacking multiple LSTM networks:

$L_1 = LSTM_1(R)$
$L_{i+1} = LSTM_{i+1}(L_i)$
$C(L_i) = f(L_i; W, b)$
$Output_{text} = [O_{L_1}, O_{L_2}, O_{L_3}, \ldots]$
$Output_{criticality} = [C(L_1), C(L_2), C(L_3), \ldots]$, In the formula, R is a feature vector after fusion; $LSTM_i$ (−) is function representation of an i-th LSTM network having feature output of $L_i$ and text output of $O_{L_i}$; f(−; W,b) is function representation of criticality operation, W and b are a weight matrix and an offset vector of a layer undertaking the operation, and the criticality obtained based on the $L_i$ operation is expressed as $C_{L_i}$; $Output_{text}$ is a complete text description finally generated, and is a queue composed of the text output of each LSTM network; and $Output_{criticality}$ is a queue composed of a key rate corresponding to each word in the text description.

Step 10: information related to cataloging knowledge in steps 1 to 9 is assembled, and output as data of a structure including {"original video id", "fragment sequence id", "start and end time of fragment", "automatic description text", "automatic character recognition", "automatic scene classification", "subtitle recognition text", "voice recognition text", and "automatic news keyword" }, and stored in a database. Steps 1 to 10 fully realize the automated process of intelligent cataloging for the news video.

Figure 4:
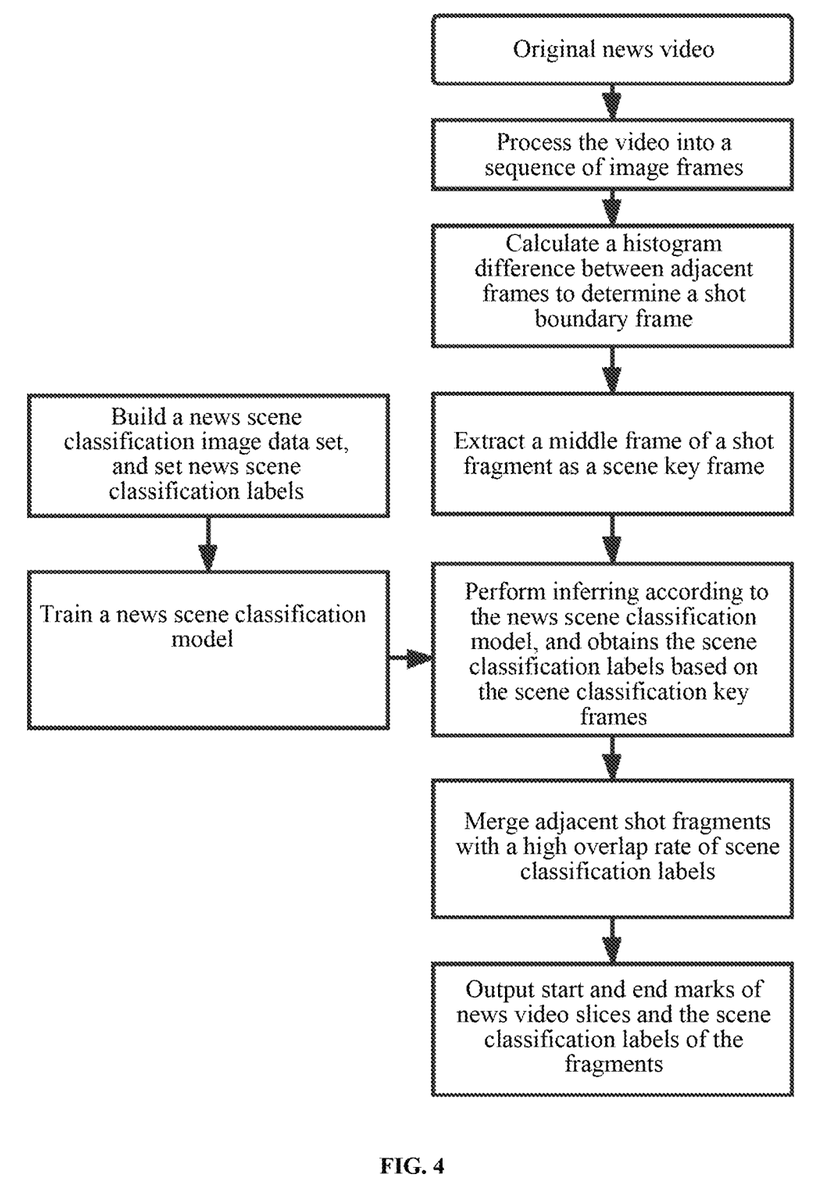
FIG. 4 is a schematic flow diagram of a fast video slicing and classification method for news scenes according to the present disclosure.

As shown in FIG. 4, the present disclosure includes a fast video slicing and classification method for news scenes in steps 1 to 4 to achieve the tasks of video slicing and scene classification. The method first quickly locates the shot boundary frame through the histogram difference between the frames. Then, only the middle frame in the shot is selected as the key frame image and input into the trained news scene classification model. Then, inferring is quickly performed from the preset news scene classification labels such as "studio", "conference site", and "outdoor connection" to obtain the labels with a high matching degree. Finally, the adjacent shot fragments with a high label overlap rate are merged, and the slice and scene classification results are output.

What is claimed is:

1. An intelligent cataloging method for all-media news based on multi-modal information fusion understanding, comprising the following steps:
   1) obtaining original news video, segmenting shot fragments, and locating scene key frames;
   2) inferring scene classification labels from the scene key frames obtained in step 1) and merging adjacent shot fragments with similar scene labels to generate multiple slice fragments;
   3) performing visual feature extraction on the slice fragments obtained in step 2) and generating news description text;
   4) performing voice recognition on the slice fragments obtained in step 2) to obtain voice text;
   5) extracting image frame recognition of the slice fragments obtained in step 2) to obtain subtitle bar text;
   6) recognizing facial features in the slice fragments obtained in step 2) and matching the facial features in a news character database to obtain character information text; and
   7) inputting the news description text obtained in step 3), the voice text obtained in step 4), the subtitle bar text obtained in step 5), and the character information text obtained in step 6) into a generative model of multi-modal fusion for processing to generate news keywords and comprehensive cataloging descriptions, and performing outputting after sorting and assembly to complete intelligent cataloging for the news.

2. The intelligent cataloging method for all-media news based on multi-modal information fusion understanding according to claim 1, wherein in step 1), a process of obtaining original news video, segmenting shot fragments and locating scene key frames specifically comprises:
   processing the original news video into a set of static image frames, calculating a histogram difference between each frame and the previous frame, setting a window range and a window moving step, taking a frame with the maximum difference in a window as a shot boundary frame, taking all frames between two shot boundary frames as the shot fragment, and extracting a middle frame of each shot fragment as the scene key frame of the fragment.

3. The intelligent cataloging method for all-media news based on multi-modal information fusion understanding according to claim 1, wherein in step 2), a process of inferring scene classification labels from the scene key frames obtained in step 1) and merging adjacent shot fragments with similar scene labels to generate multiple slice fragments specifically comprises:
   A) extracting visual features of each scene key frame through a trained residual network for a news scene classification task, and obtaining the scene classification labels for news scenes with the highest matching degree by inferring;

B) based on the scene classification labels of each fragment obtained in step A), merging adjacent same scenes; and
C) taking shot boundary marks remaining after processing in step B) as slice marks of the news video, and taking a frame sequence between adjacent shot boundary marks as the slice fragment to generate the multiple slice segments.

4. The intelligent cataloging method for all-media news based on multi-modal information fusion understanding according to claim 1, wherein in step 7), the news description text obtained in step 3) is taken as a main feature, and the voice text obtained in step 4), the subtitle bar text obtained in step 5), and the character information text obtained in step 6) are taken as auxiliary features to input into the generative model of multi-modal fusion.

5. The intelligent cataloging method for all-media news based on multi-modal information fusion understanding according to claim 1, wherein in step 7), a process of inputting into a generative model of multi-modal fusion for processing specifically comprises:
inputting the news description text, the voice text, the subtitle bar text, and the character information text into an embedding layer trained through news corpus text to transform the text into semantic feature vectors, then mapping these vectors to a unified semantic space through a unified mapping layer respectively, then passing the vectors in the unified semantic space to a news semantic fusion layer for fusion understanding to obtain news fusion features with redundant information eliminated, and finally using the news fusion features to generate the comprehensive cataloging descriptions and a criticality of the news keywords through a trained text decoding layer.

6. The intelligent cataloging method for all-media news based on multi-modal information fusion understanding according to claim 5, wherein in step 7), the generative model of multi-modal fusion uses the following formulas:

text embedding: $V_x = x_1 v_1 + x_2 v_2 + \ldots + x_n v_n$, in the formula, x is one-hot encoding of embedded text based on an embedded dictionary, and n is a dimension of the embedded dictionary; if $x_i$ is a non-zero bit of x, $v_i$ is a vector row of the text corresponding to the embedded dictionary; and $V_x$ is a vector after the text is embedded;

unified mapping:

$$W(x) = f(Ax^T + b) = f\left(\begin{bmatrix} a_{1,1} & a_{1,2} & \cdots & a_{1,k} \\ a_{2,1} & a_{2,2} & \cdots & a_{2,k} \\ \vdots & \vdots & \vdots & \vdots \\ a_{m,1} & a_{m,2} & \cdots & a_{m,k} \end{bmatrix} \cdot \begin{bmatrix} x_1 \\ x_2 \\ \vdots \\ x_k \end{bmatrix} + \begin{bmatrix} b_1 \\ b_2 \\ \vdots \\ b_m \end{bmatrix}\right),$$

in the formula, A, b, and f(−) represent a weight matrix, an offset vector, and an activation function of the mapping layer respectively; k is a dimension of an input vector x; and m is a vector dimension of a unified domain after mapping;

semantic fusion:

$$R(x_1, x_2, x_3, \cdots) = f\left(A \begin{bmatrix} w_1 x_1 \\ w_2 x_2 \\ w_3 x_3 \\ \vdots \end{bmatrix} + b\right),$$

in the formula, $x_i$ is a vector of a mode i in the unified semantic space, and $w_i$ is a news semantic weight coefficient corresponding to $x_i$; and A, b, and f(−) represent a weight matrix, an offset vector, and an activation function of a final layer of the fusion layer respectively; and text decoding: the process is implemented by stacking multiple long short-term memory (LSTM) networks:
$L_1 = LSTM_1(R)$
$L_{i+1} = LSTM_{i+1}(L_i)$
$C(L_i) = f(L_i; W, b)$
$Output_{text} = [O_{L_1}, O_{L_2}, O_{L_3}, \ldots]$
$Output_{criticality} = [C(L_1), C(L_2), C(L_3), \ldots]$, in the formula, R is a feature vector after fusion; $LSTM_i(−)$ is function representation of i an i-th LSTM network having feature output of $L_i$ and text output of $O_{L_i}$; f(−;W,b) is function representation of criticality operation, W and b are a weight matrix and an offset vector of a layer undertaking the operation, and the criticality obtained based on the $L_i$ operation is expressed as $C_{L_i}$; $Output_{text}$ is a complete text description finally generated, and is a queue composed of the text output of each LSTM network; and $Output_{criticality}$ is a queue composed of a key rate corresponding to each word in the text description.

* * * * *